US012080321B2

(12) United States Patent
Miyamoto et al.

(10) Patent No.: US 12,080,321 B2
(45) Date of Patent: Sep. 3, 2024

(54) MAGNETIC DISK DEVICE

(71) Applicants:KABUSHIKI KAISHA TOSHIBA, Tokyo (JP); TOSHIBA ELECTRONIC DEVICES & STORAGE CORPORATION, Tokyo (JP)

(72) Inventors: Koichiro Miyamoto, Yokohama Kanagawa (JP); Kenichiro Oozeki, Yokohama Kanagawa (JP); Yu Chen, Sagamihara Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/942,943

(22) Filed: Sep. 12, 2022

(65) Prior Publication Data

US 2023/0282236 A1    Sep. 7, 2023

(30) Foreign Application Priority Data

Mar. 7, 2022    (JP) .................................. 2022-034175

(51) Int. Cl.
*G11B 21/08*    (2006.01)
(52) U.S. Cl.
CPC .................................. *G11B 21/08* (2013.01)
(58) Field of Classification Search
None
See application file for complete search history.

(56) References Cited

U.S. PATENT DOCUMENTS

| 4,589,036 | A | * | 5/1986 | Bertschy | .............. | G11B 5/6005 |
| 5,663,846 | A | | 9/1997 | Masuoka et al. | | |
| 6,072,652 | A | * | 6/2000 | Lee | .......... | G11B 19/20 |
| | | | | | | 360/71 |
| 6,229,663 | B1 | * | 5/2001 | Yoneda | .................... | G11B 5/54 |
| 6,570,360 | B1 | * | 5/2003 | Freeman | ................. | H02P 6/182 |
| | | | | | | 318/798 |

(Continued)

FOREIGN PATENT DOCUMENTS

JP    2011248965 A    * 12/2011

OTHER PUBLICATIONS

Machine translation of Kurosawa et al., JP-2011248965-A (Year: 2011).*

*Primary Examiner* — Peter Vincent Agustin
(74) *Attorney, Agent, or Firm* — Kim & Stewart LLP (57) ABSTRACT

According to one embodiment, a magnetic disk device includes a magnetic disk, a magnetic head, an actuator, a controller, and a ramp. The magnetic head is configured to record data on and reproduce data from the magnetic disk. The actuator is configured to move the magnetic head relative to the magnetic disk. The controller is configured to control the actuator. The ramp is configured to hold the magnetic head. The controller is configured to, in a retract operation for causing the actuator to retract the magnetic head to the ramp, alternate detection of a back electromotive force of the actuator and application of a voltage corresponding to the back electromotive force to the actuator, and skip the detection of the back electromotive force a predetermined number of times in response to an event that the magnetic head moves at a speed outside a predetermined range.

10 Claims, 8 Drawing Sheets

(56) References Cited

U.S. PATENT DOCUMENTS

| | | | |
|---|---|---|---|
| 6,631,045 B1 | 10/2003 | Pedrazzini | |
| 6,721,119 B1* | 4/2004 | Hassan | G11B 21/12 |
| 6,950,272 B1* | 9/2005 | Rice | G11B 5/54 |
| 7,804,660 B2 | 9/2010 | Gong et al. | |
| 8,982,501 B1* | 3/2015 | Nicholls | G11B 19/28 |
| | | | 360/75 |
| 9,117,473 B1* | 8/2015 | Kinney | G11B 5/5547 |
| 2002/0084760 A1* | 7/2002 | Messenger | G11B 19/20 |
| | | | 318/400.35 |
| 2005/0067986 A1* | 3/2005 | Kurosawa | G11B 19/28 |
| | | | 318/400.2 |
| 2018/0096704 A1* | 4/2018 | Kurosawa | G11B 19/2063 |

\* cited by examiner

| N | Vth (N) |
|---|---------|
| 0 | 0 V |
| 1 | 100 mV |
| 2 | 200 mV |
| 3 | 300 mV |
| ... | ... |
| 10 | 1000 mV |

MAGNETIC DISK DEVICE

CROSS-REFERENCE TO RELATED APPLICATIONS

This application is based upon and claims the benefit of priority from Japanese Patent Application No. 2022-034175, filed on Mar. 7, 2022, the entire contents of which are incorporated herein by reference.

FIELD

Embodiments described herein relate generally to a magnetic disk device.

BACKGROUND

A magnetic disk device such as a hard disk drive performs a retract operation, for example, in the event of a power supply disconnection or cut-off. In the retract operation, an actuator, e.g., a voice coil motor, included in the magnetic disk device retracts a magnetic head to the ramp.

In the retract operation, the magnetic disk device generally performs speed feedback control over the magnetic head based on a back electromotive force of the actuator. The magnetic disk device alternates detection of the back electromotive force and voltage application to the actuator.

The magnetic head may move at a speed largely different from a target speed in the retract operation. In such a case it may take a longer time for the magnetic head to reach the target speed.

DETAILED DESCRIPTION

In general, according to one embodiment, a magnetic disk device includes a magnetic disk, a magnetic head, an actuator, a controller, a ramp. The magnetic head is configured to record data on and reproduce data from the magnetic disk. The actuator is configured to move the magnetic head relative to the magnetic disk. The controller is configured to control the actuator. The ramp is configured to hold the magnetic head. The controller is configured to, in a retract operation for causing the actuator to retract the magnetic head to the ramp, alternate detection of a back electromotive force of the actuator and application of a voltage corresponding to the back electromotive force to the actuator, and skip the detection of the back electromotive force a predetermined number of times in response to an event that the magnetic head moves at a speed outside a predetermined range.

First Embodiment

Hereinafter, a first embodiment will be described with reference to FIGS. 1 to 6. Note that, in the present specification, components according to embodiments and description of the components may be described in a plurality of expressions. The components and the descriptions thereof are examples, and are not limited by the expression of the present specification. The components may also be identified with names different from those herein. In addition, the components may be described by an expression different from the expression in the present specification.

Figure 1:
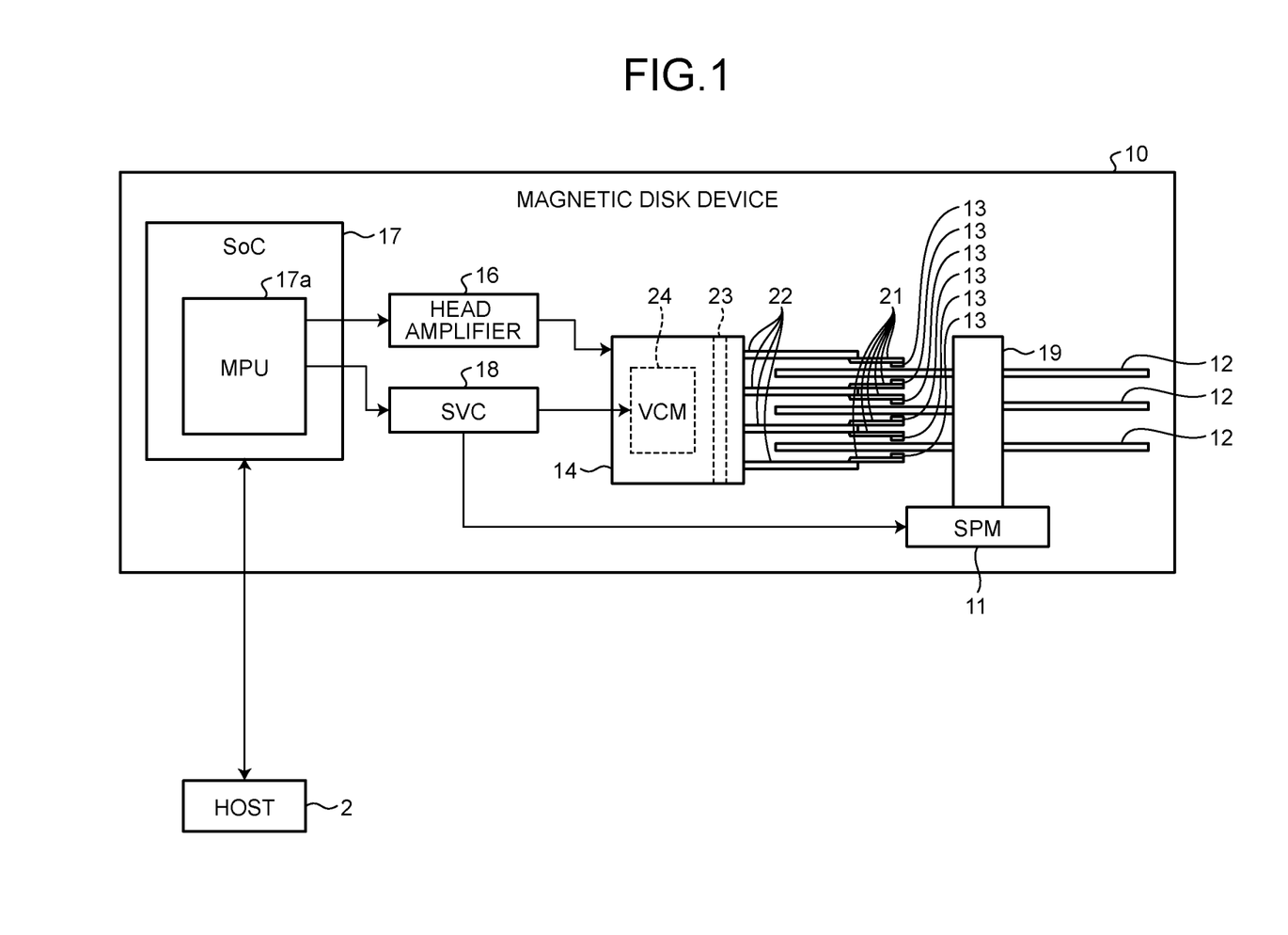
FIG. 1 is an exemplary diagram illustrating an example of a configuration of a magnetic disk device according to a first embodiment.

FIG. 1 is an exemplary diagram illustrating an example of a configuration of a magnetic disk device 10 according to the first embodiment. The magnetic disk device 10 is, for example, a hard disk drive (HDD). Note that the magnetic disk device 10 may be another magnetic disk device such as a hybrid HDD.

The magnetic disk device 10 can be connected to a host 2. For example, the magnetic disk device 10 and the host 2 can perform communication conforming to the serial attached SCSI (SAS) standard. Note that the standard for a communication path between the magnetic disk device 10 and the host 2 is not limited to the example.

The host 2 is, for example, a processor, a personal computer, or a server. The magnetic disk device 10 can receive an access command (a read command and a write command) from the host 2.

Figure 2:
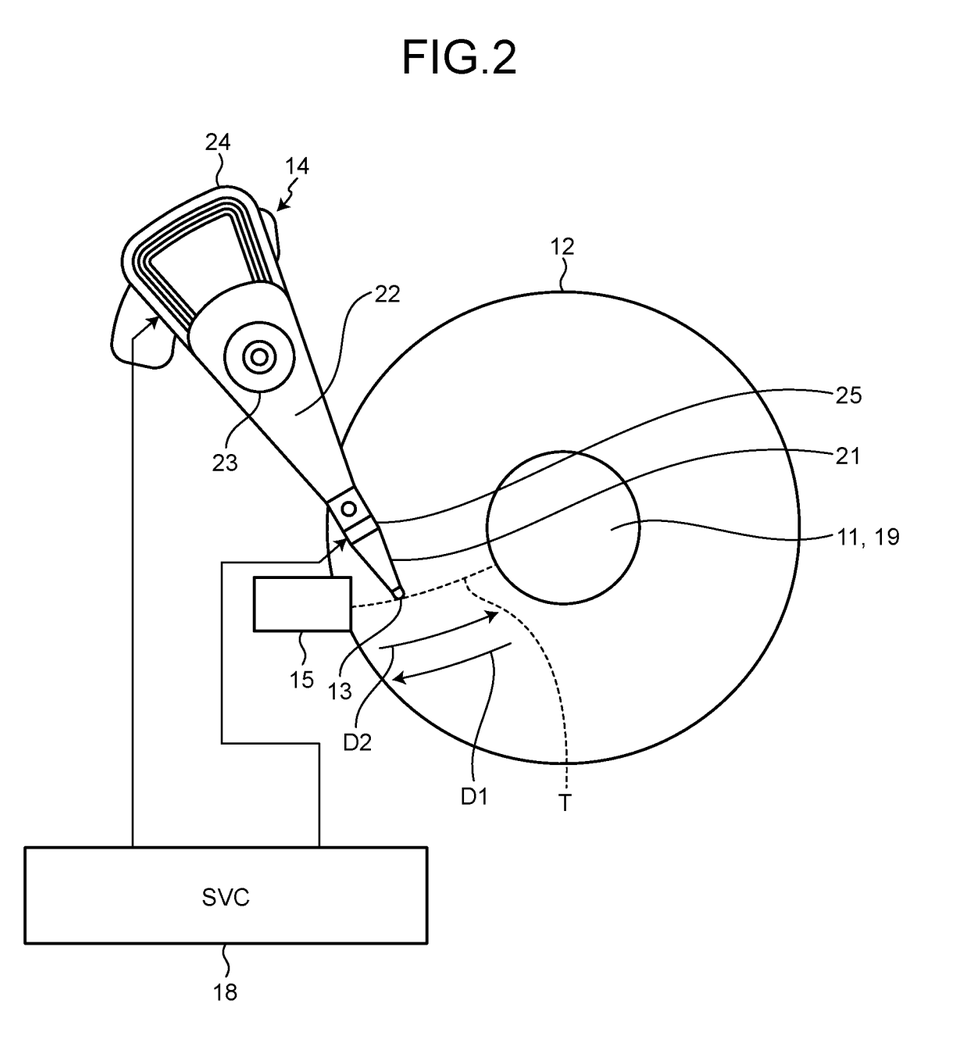
FIG. 2 is an exemplary plan view schematically illustrating the magnetic disk device according to the first embodiment.

FIG. 2 is an exemplary plan view schematically illustrating the magnetic disk device 10 according to the first embodiment. As illustrated in FIGS. 1 and 2, the magnetic disk device 10 includes a spindle motor (SPM) 11, a plurality of magnetic disks 12, a plurality of magnetic heads 13, an actuator system 14, a ramp load mechanism 15, a head amplifier 16, an SoC 17, and a servo controller (SVC) 18. The ramp load mechanism 15 is an example of a ramp. The SVC 18 is an example of a controller, and may also be referred to as, for example, a servo combo. The controller may be another component.

The SPM 11 has a rotation shaft 19. The plurality of magnetic disks 12 is held on the rotation shaft 19 by, for example, clamps. The SPM 11 can integrally rotate the plurality of magnetic disks 12 around the rotation shaft 19.

The magnetic disks 12 each have recording surfaces on both sides on which data is recordable. The number of the magnetic heads 13 is set so that the magnetic heads 13 can access the recording surfaces of the respective magnetic disks 12.

The magnetic heads 13 are disposed so as to oppose the recording surfaces of the corresponding magnetic disks 12. Each of the magnetic heads 13 can record data on and reproduce data from the recording surfaces of the opposing magnetic disk 12.

As illustrated in FIG. 2, the actuator system 14 includes a plurality of suspensions 21, a plurality of actuator arms 22, a rotation shaft 23, a voice coil motor (VCM) 24, and a plurality of microactuators (MA) 25. The VCM 24 is an example of an actuator. The number of suspensions 21, actuator arms 22, and MAs 25 is set corresponding to the number of magnetic heads 13. The actuator system 14 may also include a plurality of VCMs 24.

Each of the suspensions 21 has an elastically deformable plate shape. Each suspension 21 supports the corresponding magnetic head 13 at near the tip.

One end portions of the plurality of actuator arms 22 are supported by the rotation shaft 23 so as to be rotatable about the rotation shaft 23. The other end of each of the plurality of actuator arms 22 is attached to corresponding one of the plurality of suspensions 21.

The VCM 24 rotates the actuator arm 22 and the suspension 21 attached to the actuator arm 22 within a predetermined range around the rotation shaft 23. The rotation shaft 19 of the SPM 11 and the rotation shaft 23 of the actuator system 14 are apart from each other substantially in parallel. The VCM 24 can thus move the magnetic head 13 supported by the suspension 21 with respect to the magnetic disk 12.

The VCM 24 moves the actuator arm 22 substantially parallel to the recording surfaces of the magnetic disk 12. The VCM 24 of the present embodiment moves, with respect to the magnetic disk 12, the magnetic head 13 in a radial direction substantially orthogonal to the rotation shaft 19.

The MA 25 is provided at a connected portion between the suspension 21 and the actuator arm 22. The MA 25 is, for example, an actuator element such as a piezoelectric element. The MA 25 can move the suspension 21 substantially parallel to the recording surface of the magnetic disk 12. In other words, the actuator system 14 is configured as a two-stage actuator that moves the magnetic head 13 by the VCM 24 and the MA 25.

The actuator system 14 can move the magnetic head 13 along a track T relative to the recording surface of the magnetic disk 12 by the VCM 24 and the MA 25. The ramp load mechanism 15 is provided on the track T near an outer edge of the magnetic disk 12. Therefore, the VCM 24 can move the magnetic head 13 between the ramp load mechanism 15 and the rotation shaft 19.

The ramp load mechanism 15 allows the plurality of magnetic heads 13 to be parked thereon, for example, at the time of unloading and retraction. For example, the ramp load mechanism 15 can hold each magnetic head 13 supported by the suspension 21 at a retracted position by supporting a lift tab located at the tip of the suspension 21.

The head amplifier 16 illustrated in FIG. 1 amplifies and outputs a signal read from the magnetic disk 12 by the magnetic head 13 to supply the signal to the SoC 17. The SoC 17 demodulates the signal supplied from the head amplifier 16 into digital data by a read channel circuit.

Furthermore, the SoC 17 supplies a signal corresponding to the digital data to the head amplifier 16. The head amplifier 16 amplifies the signal supplied from the SoC 17 and supplies the signal amplified to the magnetic head 13. The magnetic head 13 records the signal supplied from the head amplifier 16 on the recording surface of the magnetic disk 12.

The SVC 18 controls the VCM 24 and the MA 25 of the actuator system 14. Specifically, the SVC 18 drives the actuator system 14 in accordance with an instruction from the SoC 17 to position the magnetic head 13 as instructed by the SoC 17.

Further, the SVC 18 drives the SPM 11 based on the instruction from the SoC 17. The SVC 18 drives the SPM 11 so that a rotation speed of the SPM 11 becomes constant at a predetermined target speed.

The SVC 18 retracts the magnetic head 13 when a power supply to the magnetic disk device 10 is cut off. Furthermore, the SVC 18 may retract the magnetic head 13 when a seek error occurs in positioning control of the magnetic head 13.

The retraction of the magnetic head 13 is an operation of retracting the magnetic head 13 to the ramp load mechanism 15. In the following description, the operation of retracting the magnetic head 13 may be referred to as a retract operation.

The SoC 17 is electrically connected to the host 2. The SoC 17 interprets an access command from the host 2 and executes various controls such as access to the magnetic disk 12 based on an interpretation result.

The SoC 17 includes a micro-processing unit (MPU) 17a. The MPU 17a operates according to a firmware program. The firmware program is stored in a predetermined non-volatile storage area. The predetermined non-volatile storage area may be the magnetic disk 12 or a read only memory (ROM) of the SoC 17.

The MPU 17a controls an entire operation of the magnetic disk device 10. For example, the MPU 17a controls access to the magnetic disk 12 using the magnetic head 13 via the head amplifier 16. In addition, the MPU 17a instructs the SVC 18 to perform rotation control of the SPM 11 and performs loading/unloading control of the actuator system 14 via the SVC 18.

In addition, in the positioning control, the MPU 17a calculates an instruction value of a drive voltage of the VCM 24 and an instruction value of a drive voltage of the MA 25 in order to cause the position of the magnetic head 13 to follow a target position pos_target. The MPU 17a calculates each instruction value using a position signal pos read by the magnetic head 13 from servo information formed on the recording surface of the magnetic disk 12 as a feedback input, and transmits each instruction value obtained to the SVC 18.

The SVC 18 applies a voltage corresponding to the instruction value of the drive voltage of the VCM 24 to the VCM 24, and applies a voltage corresponding to the instruction value of the drive voltage of the MA 25 to the MA 25. As a result, the magnetic head 13 is positioned at the target position pos_target.

Hereinafter, the retract operation in the magnetic disk device 10 will be described. When the power supply to the magnetic disk device 10 is cut off and rotation of the magnetic disk 12 is stopped, the magnetic head 13 may come into contact with the magnetic disk 12. Therefore, when the power supply is cut off, the magnetic disk device 10 executes the retract operation. As a result, the magnetic disk device 10 safely retracts the magnetic head 13 to the ramp load mechanism 15.

For example, when the power supply voltage supplied to the SVC 18 falls below a predetermined voltage, the SVC 18 starts retract operation control. When the power supply to the magnetic disk device 10 is cut off, the power supply voltage supplied to the SVC 18 falls below the above-described predetermined voltage, and the SVC 18 starts the retract operation control.

The SVC 18 can continue the retract operation control without being interrupted by the MPU 17a until the retract operation is completed. For example, in response to occurrence of a seek error during the positioning control, the SVC 18 may control the retract operation, following an instruction from the MPU 17a.

In the retract operation, the SVC 18 applies a voltage to the VCM 24 in a rectangular waveform. In other words, the SVC 18 performs on/off control of the drive voltage of the VCM 24. The SVC 18 detects a back electromotive force (BEMF) of the VCM 24 in a period when the drive voltage of the VCM 24 is off. BEMF is also referred as counter-electromotive force (CEMF).

The SVC 18 applies a drive voltage corresponding to the detected BEMF to the VCM 24. In other words, the SVC 18 uses a detected BEMF value as a feedback input to maintain the moving speed of the magnetic head 13 at a constant target speed. As a result, the SVC 18 can cause the VCM 24 to retract the magnetic head 13 to the ramp load mechanism 15 at a safe speed.

As described above, in the retract operation the SVC 18 basically alternates BEMF detection of the VCM 24 and application of a voltage corresponding to the BEMF to the VCM 24. However, the SVC 18 according to the present embodiment can skip the BEMF detection.

Figure 3:
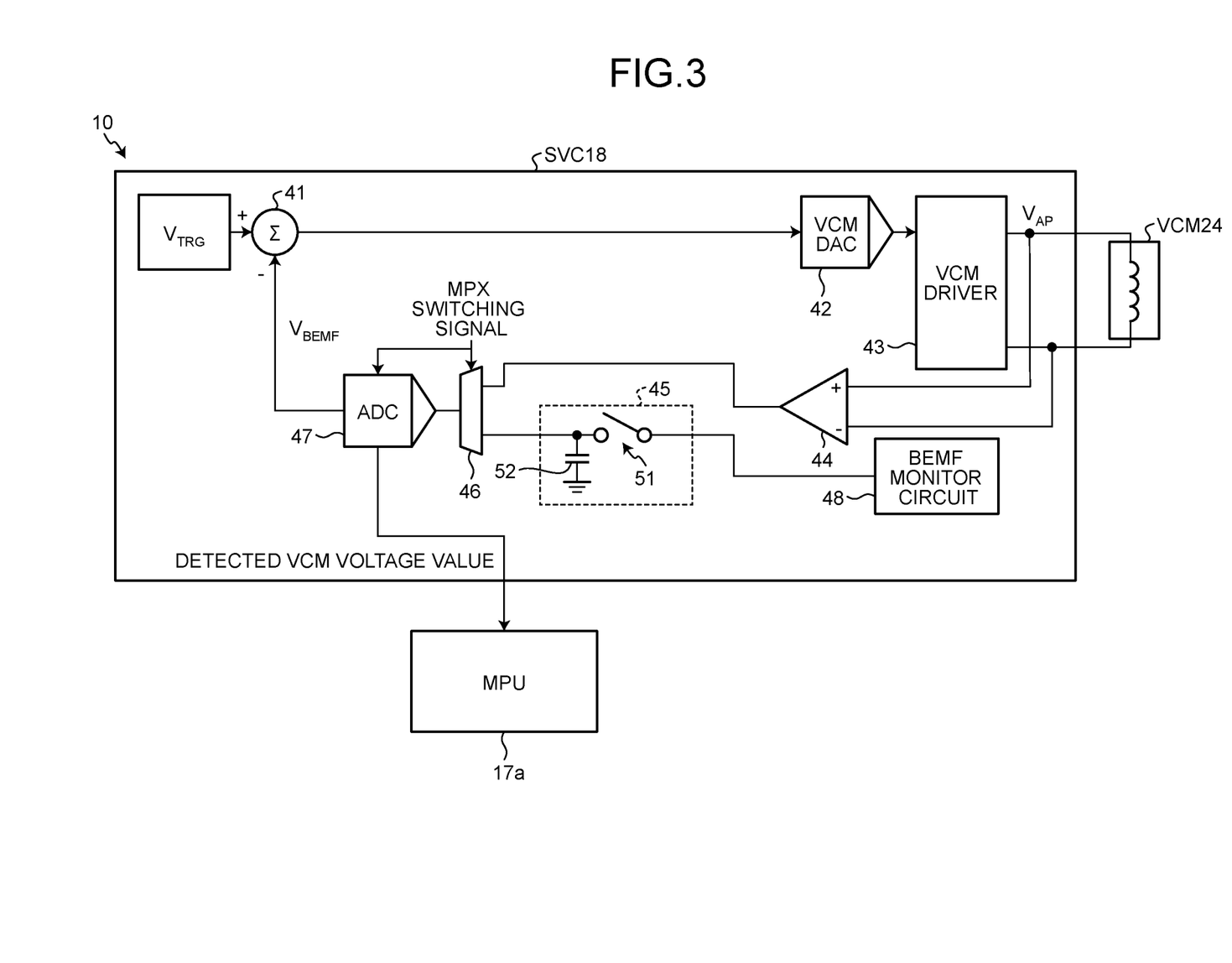
FIG. 3 is an exemplary control block diagram related to a retract operation of the magnetic disk device according to the first embodiment.

FIG. 3 is an exemplary control block diagram related to the retract operation of the magnetic disk device 10 according to the first embodiment. As illustrated in FIG. 3, the SVC 18 includes an adder 41, a VCM digital-analog converter (DAC) 42, a VCM driver 43, an amplifier 44, a BEMF sampling circuit 45, a selector 46, an analog-digital converter (ADC) 47, and a BEMF monitor circuit 48. These elements can be constituted of, for example, hardware circuitry.

A target BEMF value (target voltage) $V_{TRG}$ of the VCM 24 and a detected BEMF value $V_{BEMF}$ of the VCM 24 are input to the adder 41. The value $V_{BEMF}$ corresponds to a motor speed of the VCM 24 and each of the speeds of the magnetic head 13, the suspension 21, and the actuator arm 22. In other words, the target voltage $V_{TRG}$ corresponds to a target speed of the magnetic head 13. The target voltage $V_{TRG}$ is determined in advance and stored in a register of the SVC 18.

The adder 41 subtracts the detected BEMF value $V_{BEMF}$ from the target voltage $V_{TRG}$. A value output from the adder 41 is input to the VCM DAC 42 as an instruction value of a drive voltage $V_{AP}$ of the VCM 24. The VCM DAC 42 converts an input value into an analog value, and inputs the value converted into the analog value to the VCM driver 43. The VCM driver 43 applies the drive voltage $V_{AP}$ having a value corresponding to the input value to the VCM 24.

In the example in FIG. 3, the value output from the adder 41 is directly input to the VCM DAC 42. However, the value output from the adder 41 may be input to the VCM DAC 42 via at least one filter such as a filter that multiplies a gain.

A value of the voltage output from the VCM driver 43 is amplified by the amplifier 44. The amplifier 44 outputs a value of amplified voltage to one of two input terminals included in the selector 46.

The BEMF monitor circuit 48 detects the BEMF of the VCM 24. The BEMF monitor circuit 48 outputs the detected BEMF value $V_{BEMF}$ of the VCM 24 to the BEMF sampling circuit 45.

The BEMF sampling circuit 45 includes a switch 51 and a capacitor 52. One electrode of the capacitor 52 is grounded. When an MPX switching signal input to the selector 46 indicates "input 1", the switch 51 turns to a non-conductive state and cuts off the output of the detected value $V_{BEMF}$ input from the BEMF monitor circuit 48. When the MPX switching signal indicates "input 2", the switch 51 turns to s a conductive state, and inputs the detected value $V_{BEMF}$ input from the BEMF monitor circuit 48 to the other of the two input terminals of the selector 46.

The MPX switching signal corresponds to an on/off control state of the drive voltage $V_{AP}$ of the VCM 24. When the drive voltage $V_{AP}$ of the VCM 24 is in an on state and a value of the drive voltage $V_{AP}$ applied to the VCM 24 is other than zero, "input 1" is selected by the MPX switching signal. When the drive voltage $V_{AP}$ of the VCM 24 is in an off state and a value of the drive voltage $V_{AP}$ applied to the VCM 24 is zero, "input 2" is selected by the MPX switching signal.

When the MPX switching signal indicates "input 1", the selector 46 inputs a value input from the amplifier 44 to the ADC 47. When the MPX switching signal indicates "input 1", the ADC 47 converts a value output from the amplifier 44 into a digital value, and the value converted into the digital value is sent to, for example, the MPU 17*a*.

The output value from the amplifier 44 is obtained by amplifying the voltage value applied to the VCM 24 and corresponds to the detected voltage value applied to the VCM 24. In other words, in the actuator system 14 performing the retract operation, the detected value of the voltage applied to the VCM 24 is converted into the digital value by the ADC 47 and sent to the MPU 17*a*.

When the MPX switching signal indicates "input 2", the selector 46 inputs the detected value $V_{BEMF}$ input via the BEMF sampling circuit 45 to the ADC 47. When the MPX switching signal indicates "input 2", the ADC 47 converts the detected value $V_{BEMF}$ into a digital value and inputs the digital value to the adder 41. This implements the speed control of the VCM 24 using the detected value $V_{BEMF}$ as the feedback input.

For example, the MPU 17*a* calculates the instruction value of the drive voltage $V_{AP}$ of the VCM 24 in order to cause the position of the magnetic head 13 to follow the target position pos_target. A function for the calculation is realized by, for example, executing the firmware by the MPU 17*a*. The MPU 17*a* may further calculate the instruction value of the drive voltage of the MA 25.

When the drive voltage $V_{AP}$ is applied to the VCM 24, the actuator system 14 moves the magnetic head 13. The magnetic head 13 reads the position signal pos from the magnetic disk 12 at a current position, and inputs the position signal pos to the MPU 17*a*.

The MPU 17*a* calculates the instruction value of the drive voltage $V_{AP}$ of the VCM 24 using the position signal pos input as the feedback input. In other words, the MPU 17*a* can perform the positioning control of the magnetic head 13 using the position signal pos as the feedback input. The SVC 18 may independently perform the positioning control of the magnetic head 13 without being interposed by the MPU 17*a*.

Figure 4:
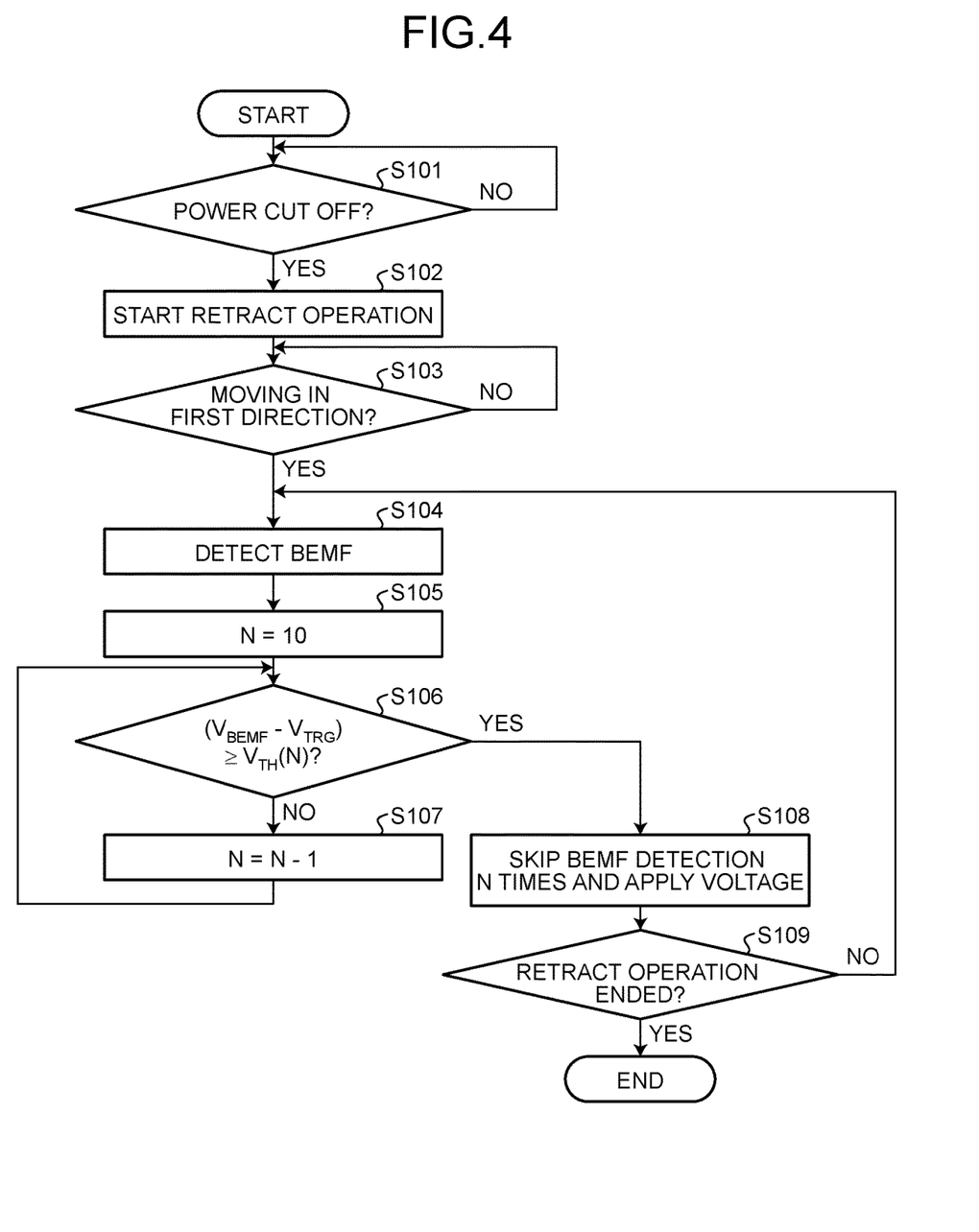
FIG. 4 is an exemplary flowchart illustrating an example of an operation of the magnetic disk device according to the first embodiment.

FIG. 4 is an exemplary flowchart illustrating an example of the operation of the magnetic disk device 10 according to the first embodiment. As described above, the SVC 18 of the present embodiment can skip the detection of the BEMF in the retract operation. Hereinafter, an example of the retract operation in the present embodiment will be described with reference to FIG. 4.

First, during the operation of the magnetic disk device 10, the SVC 18 determines whether the power supply is cut off (S101). For example, when the voltage supplied to the SVC 18 through the power supply circuit of the magnetic disk device 10 exceeds a predetermined threshold value, the SVC 18 determines that the power supply is not cut off (S101: No), and S101 is repeated without starting the retract operation.

When the voltage supplied to the SVC 18 is below the threshold value, the SVC 18 determines that the power supply is cut off (S101: Yes) and starts the retract operation (S102). Thereafter, the SVC 18 performs the positioning control of the magnetic head 13 described above according to the instruction from the MPU 17a or independently.

As illustrated in FIG. 2, in the magnetic disk device 10, the VCM 24 can move the magnetic head 13 in a first direction D1 and a second direction D2. The first direction D1 is a direction toward the ramp load mechanism 15 along the track T. The second direction D2 is a direction opposite to the first direction D1. The second direction D2 is a direction toward the rotation shaft 19 along the track T.

In the retract operation, the SVC 18 brings the speed of the magnetic head 13 close to a safe target speed by feedback control based on the BEMF described above. In the present embodiment, the SVC 18 causes the magnetic head 13 to park in the ramp load mechanism 15 after bringing the speed of the magnetic head 13 in the first direction D1 close to the target speed.

There may be a situation that the power supply to the magnetic disk device 10 may be disconnected or cut off while the magnetic head 13 is under a seek control (or moving) at a high speed in the first direction D1. In this case, the magnetic head 13 may be damaged at the time of reaching the ramp load mechanism 15 unless the magnetic head 13 is decelerated to the target speed. In view of this, the SVC 18 of the present embodiment promptly decelerates the moving speed of the magnetic head 13 in the first direction D1 to the target speed.

At a start of the retract operation in S102 in FIG. 4, the SVC 18 determines whether the magnetic head 13 is moving in the first direction D1 (S103). When the magnetic head 13 is moving in the second direction D2 (S103: No), the SVC 18 repeats S103 until the magnetic head 13 starts moving in the first direction D1.

For example, the SVC 18 determines a moving direction of the magnetic head 13 from a direction (positive or negative) of the BEMF immediately before the start of the retract operation. Note that the SVC 18 may determine the moving direction of the magnetic head 13 by another method.

While repeating S103, the SVC 18 continues the retract operation without skipping the detection of the BEMF. When the magnetic head 13 is moving in the second direction D2, the SVC 18 applies a voltage to the VCM 24 so that the magnetic head 13 moves in the first direction D1. When the voltage is applied to the SVC 18, the VCM 24 decelerates the speed of the magnetic head 13 in the second direction D2, and accelerates the speed of the magnetic head 13 in the first direction D1.

When the magnetic head 13 is determined to be moving in the first direction D1 in S103 (S103: Yes), the SVC 18 may skip the detection of the BEMF in subsequent retract operation. Hereinafter, the retract operation that can skip the detection of the BEMF will be described.

After S103 in the retract operation, when a difference (voltage difference) between the detected BEMF value $V_{BEMF}$ and the target BEMF value (target voltage) $V_{TRG}$ exceeds the predetermined threshold value, the SVC 18 skips the BEMF detection a predetermined number of times. As described above, the BEMF corresponds to the moving speed of the magnetic head 13. Due to this, the SVC 18 determines whether or not the magnetic head 13 exceeds the predetermined speed by determining whether or not the voltage difference exceeds the predetermined threshold value.

Figure 5:
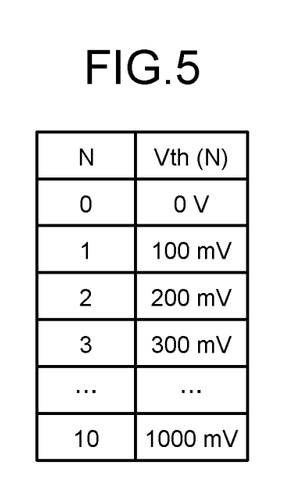
FIG. 5 is an exemplary table illustrating an example of a threshold value of a voltage difference according to the first embodiment.

FIG. 5 is an exemplary table illustrating an example of a threshold value $V_{th}(N)$ of the voltage difference according to the first embodiment. For example, the threshold value $V_{th}(N)$ of the voltage difference is determined in advance and stored in the register of the SVC 18. As illustrated in FIG. 5, in the present embodiment the predetermined threshold value includes ten threshold values $V_{th}(N)$.

For example, a $V_{th}(3)$ is an example of a first threshold value, and a $V_{th}(2)$ is an example of a second threshold value. The smaller the number (N) of the threshold $V_{th}(N)$ is, the lower the value of the threshold $V_{th}(N)$ is. The threshold value $V_{th}(2)$ is thus lower than the threshold value $V_{th}(3)$.

A maximum threshold value $V_{th}(10)$ is, for example, set to lower than a difference between the maximum voltage obtained from the capacitor 52 and the target voltage $V_{TRG}$. In other words, when the maximum amount of charge is stored in the capacitor 52, the voltage difference exceeds the threshold value $V_{th}(10)$. Note that the threshold value $V_{th}(10)$ is not limited to this example.

In the present embodiment, the number (N) of the threshold value $V_{th}(N)$ is an ordinal number and also indicates a predetermined number of times that the SVC 18 skips BEMF detection when the voltage difference exceeds the threshold value $V_{th}(N)$. A number (N=3) is an example of a first number of times, and a number (N=2) is an example of a second number of times. Note that in the threshold value $V_{th}(N)$ the ordinal number and the predetermined number of times may be different numbers.

The threshold value of the voltage difference is not limited to the example in FIG. 5. The threshold value $V_{th}(N)$ in FIG. 5 uniformly varies according to the number (N), but the variation of the threshold value $V_{th}(N)$ is not limited to this example. The predetermined threshold value of the voltage difference may be a single threshold value.

As illustrated in FIG. 4, the SVC 18 can skip the BEMF detection in the retract operation. The SVC 18 first detects the BEMF of the VCM 24 (S104). Then, the SVC 18 sets the number (N) to (N=10) (S105).

Next, the SVC 18 determines whether or not the difference (voltage difference) between the detected BEMF value $V_{BEMF}$ and the target voltage $V_{TRG}$ is equal to or greater than the threshold value $V_{th}(N)$ (S106). In other words, the SVC 18 determines whether the detected BEMF value $V_{BEMF}$ is equal to or greater than a sum of the threshold value $V_{th}(N)$ and the target voltage $V_{TRG}$.

When the voltage difference is less than the threshold value $V_{th}(N)$ (S106: No), the SVC 18 sets the number (N) to (N=N-1) (S107). The SVC 18 then returns to S106 and determines whether the voltage difference is equal to or greater than the threshold value $V_{th}(N)$ again. The SVC 18 repeats S106 and S107 until the voltage difference becomes equal to or greater than the threshold value $V_{th}(N)$.

When the voltage difference is equal to or greater than the threshold value $V_{th}(N)$ in S106 (S106: Yes), the SVC 18 skips the BEMF detection N times and applies, to the VCM 24, the drive voltage $V_{AP}$ corresponding to the detected BEMF value $V_{BEMF}$ (S108). In other words, the SVC 18 continuously applies the voltage to the VCM 24 (N+1) times.

For example, the voltage difference of 300 mV or more and less than 400 mV exceeds $V_{th}(3)$. In this case the SVC 18 skips the BEMF detection three times. The voltage difference of 200 mV or more and less than 300 mV exceeds $V_{th}(2)$. In this case the SVC 18 skips the BEMF detection twice.

Next, the SVC 18 determines whether or not the retract operation has ended (S109). For example, the SVC 18 determines whether or not the magnetic head 13 is located at the target position pos_target. For example, the SVC 18 may acquire information on the position of the magnetic head 13 from the MPU 17a.

When the retract operation is not ended in S109 (S109: No), the SVC 18 returns to S104 and detects the BEMF again. The SVC 18 repeats S104 to S109 until the retract operation is ended. When the SVC 18 determines that the retract operation has ended in S109 (S109: Yes), the operation ends.

In the exemplary retract operation in FIG. 4, the SVC 18 skips the BEMF detection the predetermined number of times when the moving speed of the magnetic head 13 in the first direction D1 exceeds the predetermined speed. However, the SVC 18 does not skip the BEMF detection when the magnetic head 13 exceeds the predetermined speed in the second direction D2. In other words, the SVC 18 detects the BEMF when the magnetic head 13 moves in the second direction D2 at a speed exceeding the predetermined speed. However, the SVC 18 may skip the BEMF detection in the retract operation when the magnetic head 13 moves in the second direction D2. In this case, the SVC 18 omits S103.

Further, in the exemplary retract operation in FIG. 4, the SVC 18 skips the BEMF detection the predetermined number of times when the moving speed of the magnetic head 13 exceeds the predetermined speed. In other words, the SVC 18 skips the BEMF detection the predetermined number of times when the magnetic head 13 moves at a speed outside a predetermined range including the predetermined speed as an upper limit.

On the other hand, even when the speed of the magnetic head 13 is lower than the predetermined speed, the SVC 18 may skip the BEMF detection the predetermined number of times. In other words, the SVC 18 may skip the BEMF detection the predetermined number of times when the magnetic head 13 moves at a speed outside a predetermined range including a threshold value as a lower limit.

For example, when the magnetic head 13 is parked in the ramp load mechanism 15, the lift tab of the suspension 21 ascends a slope provided in the ramp load mechanism 15. Here, friction between the lift tab and the ramp load mechanism 15 may cause the speed of the magnetic head 13 to significantly fall below the target speed.

When the speed of the magnetic head 13 falls below the predetermined speed, the SVC 18 skips the BEMF detection the predetermined number of times (e.g., once or twice). This allows the magnetic head 13 to promptly approach the target speed and to be smoothly parked in the ramp load mechanism 15.

In the exemplary retract operation in FIG. 4, the SVC 18 may also skip the BEMF detection after S103. In other words, the SVC 18 of the present embodiment skips the BEMF detection the predetermined number of times when the difference between at least an initially detected BEMF value $V_{BEMF}$ after S103 and the target voltage $V_{TRG}$ exceeds the threshold value $V_{th}(N)$. However, the SVC 18 may alternately perform the BEMF detection and the voltage application to the VCM 24 regardless of the differences between secondly or thereafter detected values VEMF and the target voltage $V_{TRG}$ In this case, when the retract operation has not ended in S109, the SVC 18 repeats S109, without returning to S104, and continues the retract operation without skipping the BEMF detection.

Figure 6:
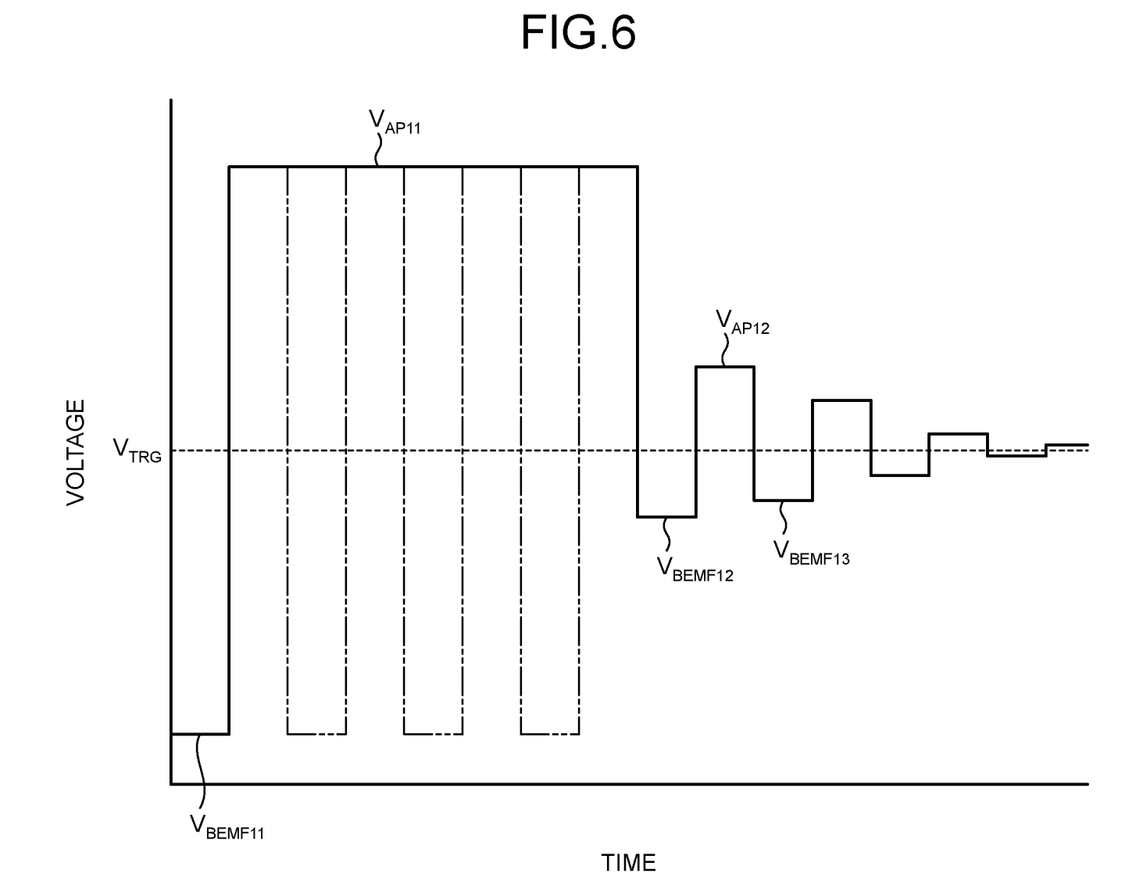
FIG. 6 is an exemplary graph illustrating an example of a drive voltage of a VCM and a detected BEMF value in the retract operation according to the first embodiment.

FIG. 6 is an exemplary graph illustrating an example of the drive voltage $V_{AP}$ of the VCM 24 and the detected BEMF value $V_{BEMF}$ in the retract operation according to the first embodiment. In the example in FIG. 6, the SVC 18 detects a BEMF value $V_{BEMF11}$ at the beginning of the retract operation.

A difference between the initially detected BEMF value $V_{BEMF11}$ in the retract operation and the target voltage $V_{TRG}$ exceeds, for example, a threshold value $V_{th}(6)$. Therefore, the SVC 18 skips the detection of the BEMF six times and continuously applies the drive voltage $V_{AP11}$ to the VCM 24 seven times.

Next, the SVC 18 detects a BEMF value $V_{BEMF12}$. A difference between the detected BEMF value $V_{BEMF12}$ and the target voltage $V_{TRG}$ exceeds, for example, a threshold value $V_{th}(0)$. The SVC 18 thus skips the detection of the BEMF zero time. In other words, the SVC 18 does not skip the BEMF detection but detects a BEMF value $V_{BEMF13}$ after applying a drive voltage $V_{AP12}$ to the VCM 24 once. Thereafter, the SVC 18 alternately performs the detection of the BEMF and the application of the voltage to the VCM 24.

In the present embodiment, while skipping the BEMF detection, the SVC 18 applies the maximum possible drive voltage $V_{AP}$ to the VCM 24. However, the voltage applied to the VCM 24 by the SVC 18 while skipping the BEMF detection is not limited to this example.

Threshold values $V_{th}(1$ to $10)$ is set such that, for example, when the SVC 18 continuously applies the maximum drive voltage $V_{AP}$ that can be applied to the VCM 24, the speed of the magnetic head 13 does not fall below the target speed. Therefore, the SVC 18 skips the detection of the BEMF and applies the drive voltage $V_{AP}$ to the VCM 24, so that the speed of the magnetic head 13 rapidly reaches the target speed but falling of the speed of the magnetic head 13 below the target speed can be suppressed.

In the retract operation of the example in FIG. 6, a pulse width (period) is constant. However, for example, the SVC 18 may change the pulse width according to the position signal pos of the magnetic head 13. Therefore, for example, one cycle before changing the pulse width and time during which the SVC 18 continuously applies the drive voltage $V_{AP}$ to the VCM 24 by skipping the BEMF detection after the change in the pulse width may be substantially the same.

In the magnetic disk device 10 according to the first embodiment described above, the SVC 18 causes the VCM 24 to retract the magnetic head 13 to the ramp load mechanism 15 in the retract operation. In the retract operation the SVC 18 alternates BEMF detection with respect to the VCM 24 and application of a voltage corresponding to the BEMF to the VCM 24. Further, in the retract operation the SVC 18 skips the BEMF detection a predetermined number of times when the magnetic head 13 moves at a speed outside a predetermined range. In other words, the SVC 18 continuously applies the voltage to the VCM 24 a predetermined number of times. In a case that the magnetic head 13 is decelerated by the SVC 18's voltage application to the VCM 24, the SVC 18's continuous voltage application thereto can rapidly decelerate the magnetic head 13. As a result, the magnetic disk device 10 can cause the moving speed of the magnetic head 13 to promptly approach the target speed in the retract operation, thereby avoiding the magnetic head 13 from being damaged, which may otherwise occur due to its own high-speed movement. In a case that the magnetic head 13 is accelerated by the SVC 18's voltage application to the VCM 24, the SVC 18's continuous voltage application can rapidly accelerate the magnetic head 13. As a result, the magnetic disk device 10 can prevent the magnetic head 13 from stopping moving in the retract operation, thereby allowing the moving speed of the magnetic head 13 to rapidly approach the target speed.

In the retract operation the SVC 18 determines that the magnetic head 13 moves at a speed outside a predetermined range, when the moving speed of the magnetic head 13 exceeds a predetermined speed. Thus, when the moving speed of the magnetic head 13 exceeds the predetermined speed, the SVC 18 skips the BEMF detection a predetermined number of times. The SVC 18 rapidly decelerates the magnetic head 13 that has been under a high-speed seek control, by continuous voltage application. As a result, the magnetic disk device 10 can promptly lower the moving speed of the magnetic head 13 to the target speed in the retract operation, thereby avoiding the magnetic head 13 from being damaged, which would otherwise occur due to its own high-speed movement.

In the retract operation the SVC 18 determines that the moving speed of the magnetic head 13 exceeds a predetermined speed when the difference between the detected BEMF value $V_{BEMF}$ and the target voltage $V_{TRG}$ being a target BEMF value exceeds a predetermined threshold value $V_{th}(N)$. In other words, the SVC 18 can measure the moving speed of the magnetic head 13 by measuring the BEMF. This eliminates the necessity for the magnetic disk device 10 to include another device for measuring the moving speed of the magnetic head 13, making it possible to avoid a cost increase.

The threshold values $V_{th}(N)$ include the threshold value $V_{th}(3)$ and the threshold value $V_{th}(2)$ lower than the threshold value $V_{th}(3)$. In the retract operation the SVC 18 skips the BEMF detection three times when the difference between the detected value $V_{BEMF}$ and the target voltage $V_{TRG}$ exceeds the threshold value $V_{th}(3)$. In the retract operation the SVC 18 also skips the BEMF detection not three times but twice less than three times when the difference between the detected value $V_{BEMF}$ and the target voltage $V_{TRG}$ is below the threshold value $V_{th}(3)$ and exceeds the threshold value $V_{th}(2)$. In this manner the SVC 18 can continuously decelerate the magnetic head 13 the number of times according to the moving speed of the magnetic head 13 to more smoothly decelerate the moving speed of the magnetic head 13 toward the target speed.

While skipping the BEMF detection, the SVC 18 applies its maximum possible voltage to the VCM 24. As a result, the SVC 18 can rapidly decelerate the magnetic head 13 that has been under a high-speed seek control. In other words, the SVC 18 refrains from skipping the BEMF detection when the magnetic head 13 moves at an appropriate speed and is not to be decelerated by the maximum voltage application. Thereby, the SVC 18 can more smoothly decelerate the moving speed of the magnetic head 13 toward the target speed.

The VCM 24 moves the magnetic head 13 in the first direction D1 toward the ramp load mechanism 15 and in the second direction D2 opposite to the first direction D1. The magnetic head 13 may arrive in the ramp load mechanism 15 at a relatively high speed in the first direction D1, which may cause damage to the magnetic head 13. In the retract operation, the SVC 18 according to the present embodiment skips the BEMF detection a predetermined number of times when the magnetic head 13 moves in the first direction D1 at a speed above a predetermined speed. In the retract operation, however, the SVC 18 detects the BEMF when the magnetic head 13 moves in the second direction D2 at a speed exceeding the predetermined speed. That is, the SVC 18 does no skip the BEMF detection when the magnetic head 13 moves in the second direction D2 at a speed above the predetermined speed. As a result, the magnetic disk device 10 can prevent the magnetic head 13 from being damaged, which would otherwise occur by its own high-speed movement. In addition, the magnetic disk device 10 does not skip the BEMF detection while the magnetic head 13 moves in the second direction D2, which can avoid an increase in power consumption in the retract operation.

In the retract operation the hardware circuitry of the SVC 18 alternates the BEMF detection and the application of the voltage corresponding to the BEMF to the VCM 24, and skips the BEMF detection a predetermined number of times when the magnetic head 13 moves at a speed outside a predetermined range. This eliminates the necessity for the SVC 18 to be subjected to a software control by another processing device such as the MPU 17a, leading to avoiding an increase in power consumption in the retract operation.

The SVC 18 may skip the BEMF detection a predetermined number of times when the difference between the initially detected BEMF value $V_{BEMF}$ in the retract operation and the target voltage $V_{TRG}$ exceeds the threshold value $V_{th}(N)$. This allows the SVC 18 to omit making determinations other than the initial determinations in the retract operation, thereby implementing a simplified control.

Second Embodiment

Hereinafter, a second embodiment will be described with reference to FIGS. 7 and 8. In the following description of the embodiment, components having functions similar to those of the components already described are denoted by the same reference signs as those of the components already described, and the description thereof may be omitted. In addition, a plurality of components denoted by the same reference sign does not necessarily have all the functions and properties in common, and may have different functions and properties according to each embodiment.

Figure 7:
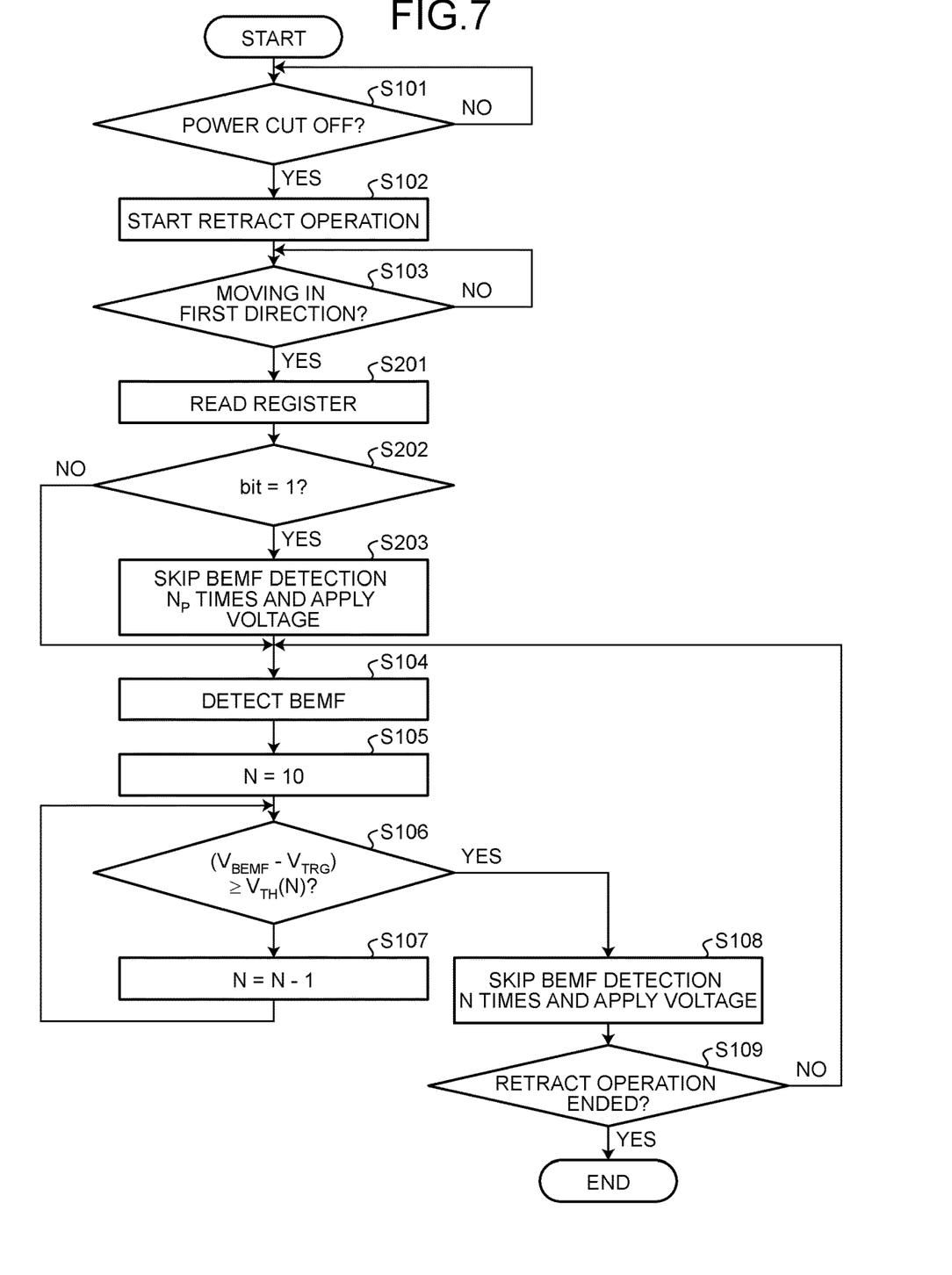
FIG. 7 is an exemplary flowchart illustrating an example of an operation of a magnetic disk device according to a second embodiment.

FIG. 7 is an exemplary flowchart illustrating an example of the operation of the magnetic disk device 10 according to the second embodiment. The retract operation of the magnetic disk device 10 according to the second embodiment is partially different from the retract operation of the magnetic disk device 10 according to the first embodiment. Hereinafter, an example of the retract operation according to the present embodiment will be described with reference to FIG. 7.

First, during the operation of the magnetic disk device 10, the SVC 18 determines whether the power supply is cut off (S101). When the power supply is determined to be cut off (S101: Yes), the SVC 18 starts the retract operation (S102).

At a start of the retract operation, the SVC 18 determines whether the magnetic head 13 is moving in the first direction D1 (S103). When the magnetic head 13 is determined to be moving in the first direction D1 (S103: Yes), the SVC 18 skips the detection of the BEMF according to the speed of the magnetic head 13 at a start of the retract operation.

For example, before the start of the retract operation, the SVC 18 stores therein information representing the moving speed of the magnetic head 13 (speed information). For example, the firmware program of the MPU 17a sets 1 to a predetermined bit in the register of the SVC 18 when the speed of the magnetic head 13 in the first direction D1 exceeds a predetermined speed and the magnetic head 13 is seeking (moving) at high speed. The bit is an example of the speed information.

For example, the bit may be set by the SVC 18 based on the BEMF. Further, the speed information is not limited to the bit in the register, and may be information stored in a random access memory (RAM), a flash memory, or the magnetic disk 12.

After S103 in the retract operation, the SVC 18 reads the bit in the register of the SVC 18 (S201). Next, the SVC 18 determines whether or not the bit indicates 1.

The bit indicating 1 (S202: Yes) signifies that the magnetic head 13 is under a seek control (or moving) in the first direction D1 at a high speed at the start of the retract operation. The SVC 18 thus skips the BEMF detection a predetermined number of times (Np times), and applies the drive voltage $V_{AP}$ according to the detected BEMF value $V_{BEMF}$ to the VCM 24 (S203) to decelerate the magnetic head 13. The number (Np) is predetermined and stored in the register of the SVC 18.

Next, the SVC 18 detects the BEMF of the VCM 24 (S104). When the bit indicates zero in S202 (S202: No), the SVC 18 skips S203 and proceeds to S104. Then, the SVC 18 sets the number (N) to (N=10) (S105).

Next, the SVC 18 determines whether or not the difference (voltage difference) between the detected BEMF value $V_{BEMF}$ and the target voltage $V_{TRG}$ is equal to or greater than the threshold value $V_{th}(N)$ (S106). When the voltage difference is less than the threshold value $V_{th}(N)$ (S106: No), the SVC 18 sets the number (N) to (N=N−1) (S107). The SVC 18 returns to S106 and determines whether the voltage difference is equal to or greater than the threshold value $V_{th}(N)$ again. The SVC 18 repeats S106 and S107 until the voltage difference becomes equal to or greater than the threshold value $V_{th}(N)$.

When the voltage difference is equal to or greater than the threshold value $V_{th}(N)$ in S106 (S106: Yes), the SVC 18 skips the BEMF detection for N times and applies, to the VCM 24, the drive voltage $V_{AP}$ corresponding to the detected BEMF value $V_{BEMF}$ (S108).

Next, the SVC 18 determines whether or not the retract operation has ended (S109). When the retract operation is not ended (S109: No), the SVC 18 returns to S104 and detects the BEMF again. The SVC 18 repeats S104 to S109 until the retract operation is ended. When the SVC 18 determines that the retract operation has ended in S109 (S109: Yes), the operation ends.

In the exemplary retract operation in FIG. 7, the SVC 18 determines based on the bit (speed information) in the register whether the moving speed of the magnetic head 13 exceeds the predetermined speed at the start of the retract operation. However, the SVC 18 may make second and subsequent determinations as to whether the moving speed of the magnetic head 13 exceeds the predetermined speed, from the bit value in the register.

Figure 8:
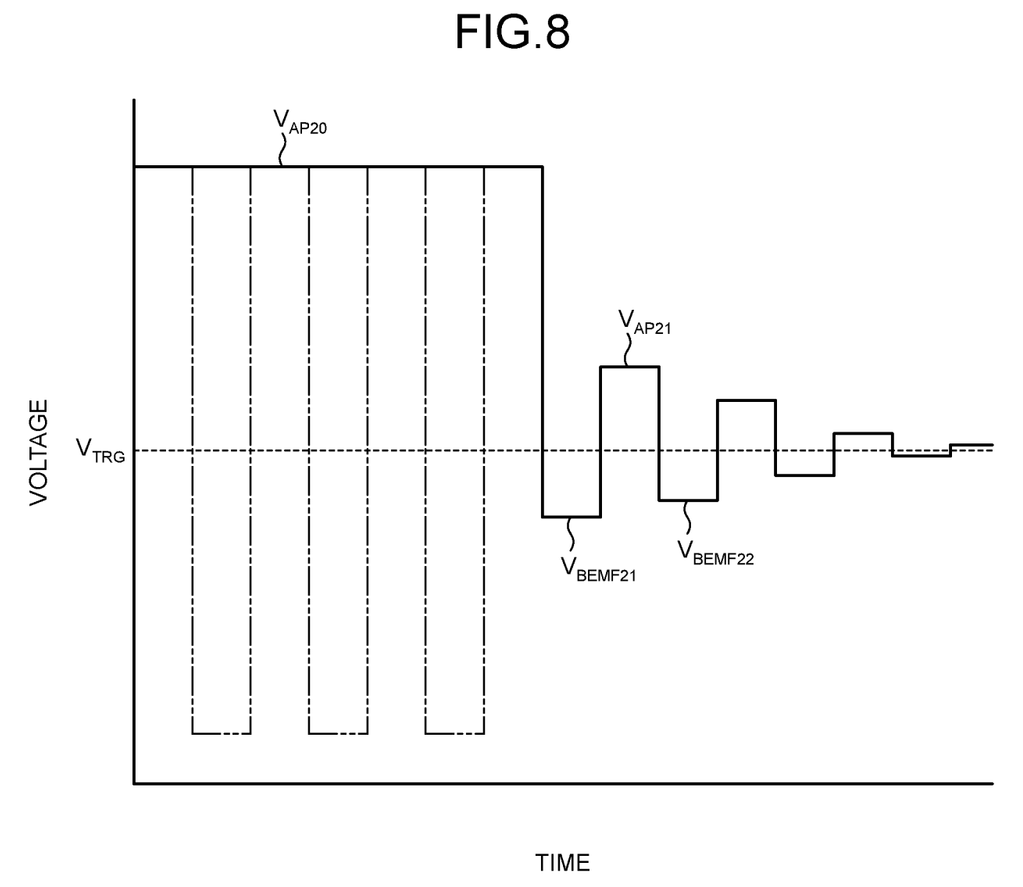
FIG. 8 is an exemplary graph illustrating an example of a drive voltage of a VCM and a detected BEMF value in a retract operation according to the second embodiment.

FIG. 8 is an exemplary graph illustrating an example of the drive voltage $V_{AP}$ of the VCM 24 and the detected BEMF value $V_{BEMF}$ in the retract operation according to the second embodiment. In the example in FIG. 8, at a start of the retract operation the SVC 18 determines whether the moving speed of the magnetic head 13 exceeds the predetermined speed, from the bit value of the register.

When the bit is set to 1 at starting the retract operation, the SVC 18 skips the detection of the BEMF for Np times (e.g., six times). Therefore, the SVC 18 continuously applies the drive voltage $V_{AP20}$ to the VCM 24 seven times.

Next, the SVC 18 detects a BEMF value $V_{BEMF21}$. A difference between the detected BEMF value $V_{BEMF21}$ and the target voltage $V_{TRG}$ exceeds, for example, the threshold value $V_{th}(0)$. Therefore, the SVC 18 skips the detection of the BEMF zero times. In other words, the SVC 18 does not skip the BEMF detection but detects a BEMF value $V_{BEMF22}$ after applying the drive voltage $V_{AP21}$ to the VCM 24 once. Thereafter, the SVC 18 alternates the BEMF detection and the voltage application to the VCM 24.

In the magnetic disk device 10 of the second embodiment described above, the SVC 18 stores the speed information (register bits) representing the moving speed of the magnetic head 13. In the retract operation, the SVC 18 determines whether the moving speed of the magnetic head 13 exceeds a predetermined speed, based on the speed information. In other words, the SVC 18 can determine the moving speed of the magnetic head 13 by reading the speed information measured in advance. As a result, the magnetic disk device 10 can promptly skip the BEMF detection without measuring the moving speed of the magnetic head 13 again.

At the start of the retract operation, the SVC 18 determines whether the moving speed of the magnetic head 13 exceeds the predetermined speed, based on the speed information. Thus, the magnetic disk device can promptly skip the BEMF detection concurrently with the start of the retract operation.

In the above description, the word "prevent" is defined as, for example, preventing occurrence of an event, an action, or an influence, or reducing a degree of the event, the action, or the influence.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
    a magnetic disk;
    a magnetic head configured to record data on and reproduce data from the magnetic disk;
    an actuator configured to move the magnetic head relative to the magnetic disk;
    a controller configured to control the actuator; and
    a ramp configured to hold the magnetic head, wherein
    the controller is configured to:
    in a retract operation for causing the actuator to retract the magnetic head to the ramp,
        alternate detection of a back electromotive force of the actuator and application of a voltage corresponding to the back electromotive force to the actuator, and
        skip the detection of the back electromotive force a predetermined number of times in response to an event that the magnetic head moves at a speed outside a predetermined range.

2. The magnetic disk device according to claim 1, wherein the controller is configured to determine that the magnetic head moves at a speed outside the predetermined range in the retract operation when the moving speed of the magnetic head exceeds a predetermined speed.

3. The magnetic disk device according to claim 2, wherein the controller is configured to determine that the moving speed of the magnetic head exceeds the predetermined speed in the retract operation, when a difference between the back electromotive force and a target value of the back electromotive force exceeds a predetermined threshold value.

4. The magnetic disk device according to claim 3, wherein the controller is configured to skip the detection of the back electromotive force the predetermined number of times when a difference between an initially detected back electromotive force in the retract operation and the target value exceeds the predetermined threshold value.

5. The magnetic disk device according to claim 3, wherein the predetermined threshold value includes a first threshold value and a second threshold value lower than the first threshold value, and
the controller is configured to:
in the retract operation,
- skip the detection of the back electromotive force a first number of times when the difference between the back electromotive force and the target value exceeds the first threshold value, and
- skip the detection of the back electromotive force a second number of times when the difference between the back electromotive force and the target value is below the first threshold value and exceeds the second threshold value, the second number of times being smaller than the first number of times.

6. The magnetic disk device according to claim 2, wherein the controller is configured to:
store speed information representing the moving speed of the magnetic head, and
determine based on the speed information whether or not the moving speed of the magnetic head exceeds the predetermined speed in the retract operation.

7. The magnetic disk device according to claim 6, wherein the controller is configured to determine based on the speed information whether or not the moving speed of the magnetic head exceeds the predetermined speed at a start of the retract operation.

8. The magnetic disk device according to claim 4, wherein the controller is configured to apply a maximum possible voltage to the actuator while skipping the detection of the back electromotive force.

9. The magnetic disk device according to claim 2, wherein the actuator is configured to move the magnetic head in a first direction toward the ramp and in a second direction opposite to the first direction, and
the controller is configured to:
in the retract operation,
- skip the detection of the back electromotive force the predetermined number of times when the magnetic head moves in the first direction at a speed exceeding the predetermined speed, and
- detect the back electromotive force when the magnetic head moves in the second direction at a speed exceeding the predetermined speed.

10. The magnetic disk device according to claim 1, wherein
the controller comprises hardware circuitry configured to:
in the retract operation,
- alternate the detection of the back electromotive force of the actuator and the application of the voltage corresponding to the back electromotive force to the actuator, and
- skip the detection of the back electromotive force the predetermined number of times in response to the event that the magnetic head moves at a speed outside the predetermined range.

* * * * *